Oct. 30, 1962 L. K. HEINRICH 3,060,766
VARIABLE RATIO SPEED REDUCER
Filed May 21, 1959 4 Sheets-Sheet 1
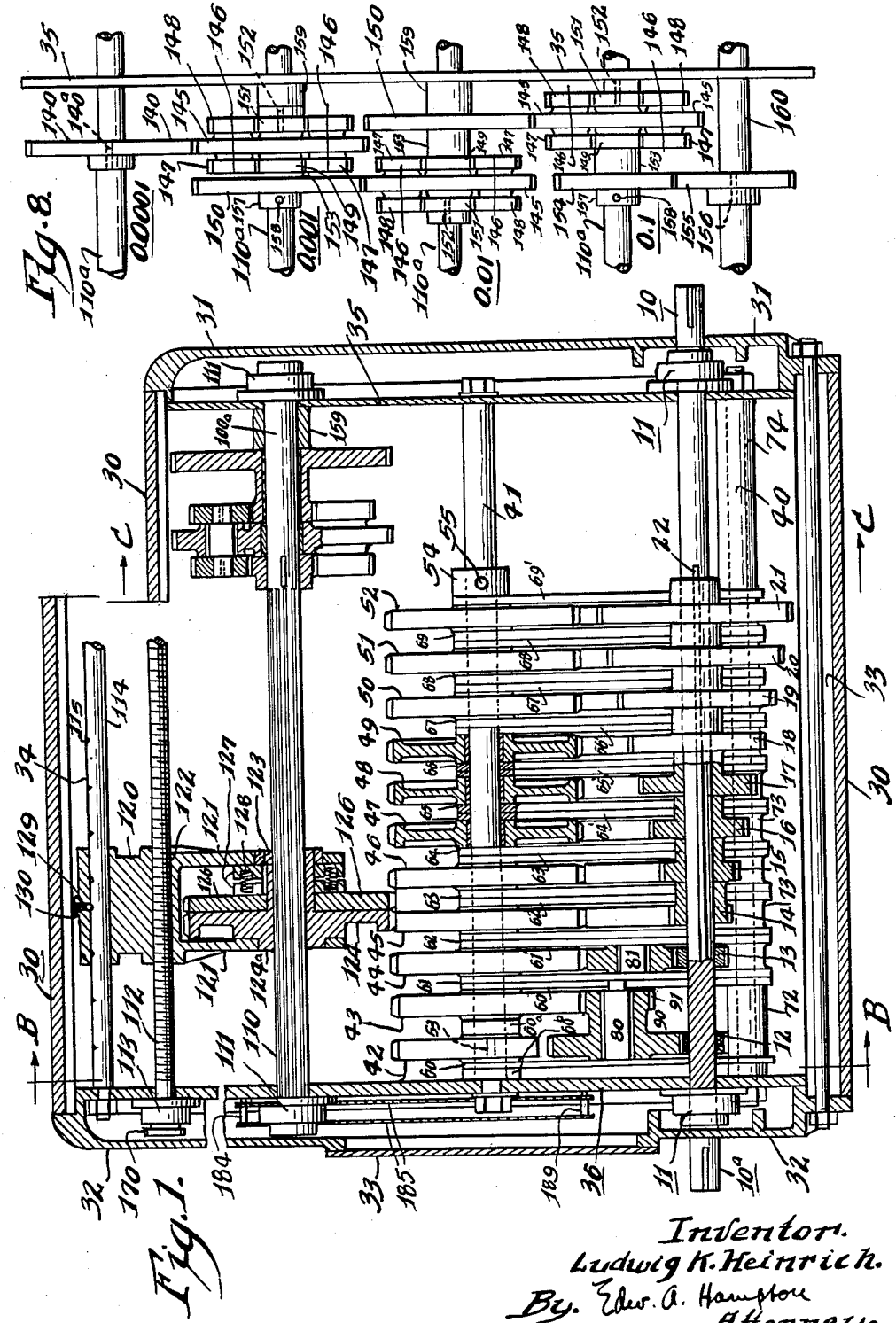
Inventor:
Ludwig K. Heinrich.
By Edw. A. Hampton
Attorney.

Oct. 30, 1962 L. K. HEINRICH 3,060,766
VARIABLE RATIO SPEED REDUCER
Filed May 21, 1959 4 Sheets-Sheet 2
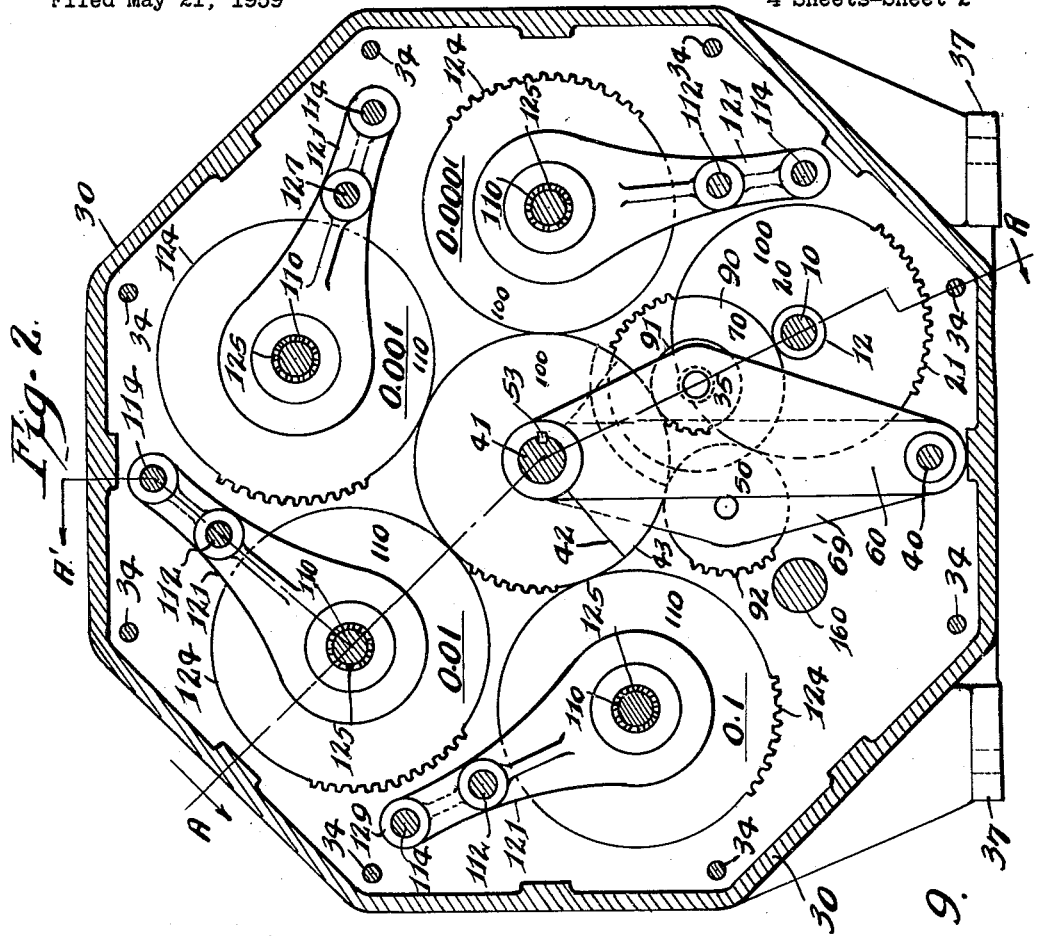
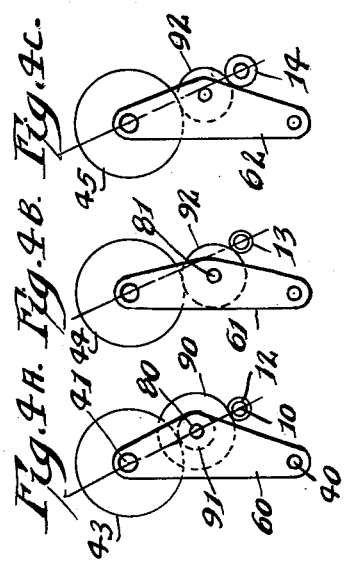
Inventor.
Ludwig K. Heinrich
By Edw. A. Hampson
Attorney.

Oct. 30, 1962 L. K. HEINRICH 3,060,766
VARIABLE RATIO SPEED REDUCER
Filed May 21, 1959 4 Sheets-Sheet 3
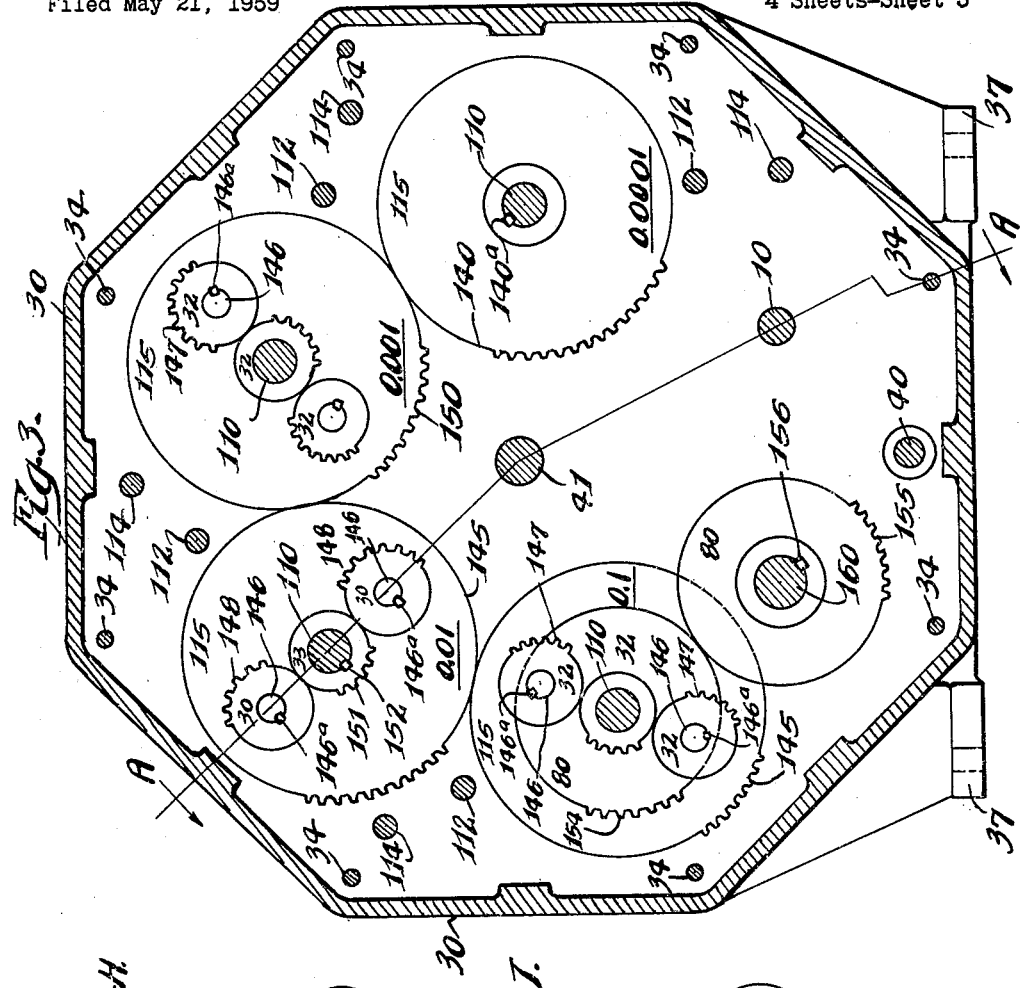
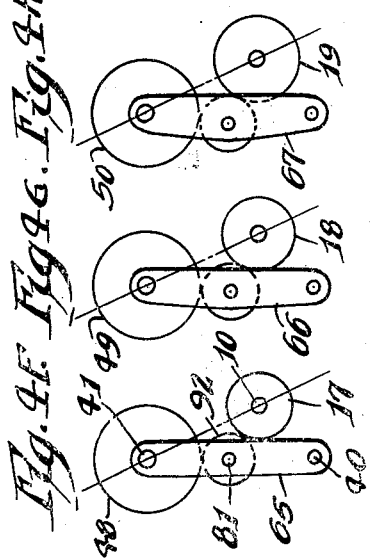
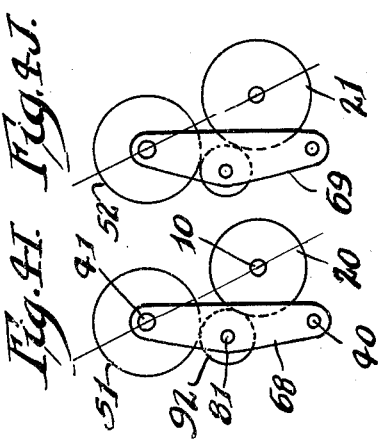
Inventor.
Ludwig K. Heinrich.
By. Edw. A. Hampson
Attorney.

Oct. 30, 1962          L. K. HEINRICH          3,060,766
VARIABLE RATIO SPEED REDUCER
Filed May 21, 1959          4 Sheets-Sheet 4
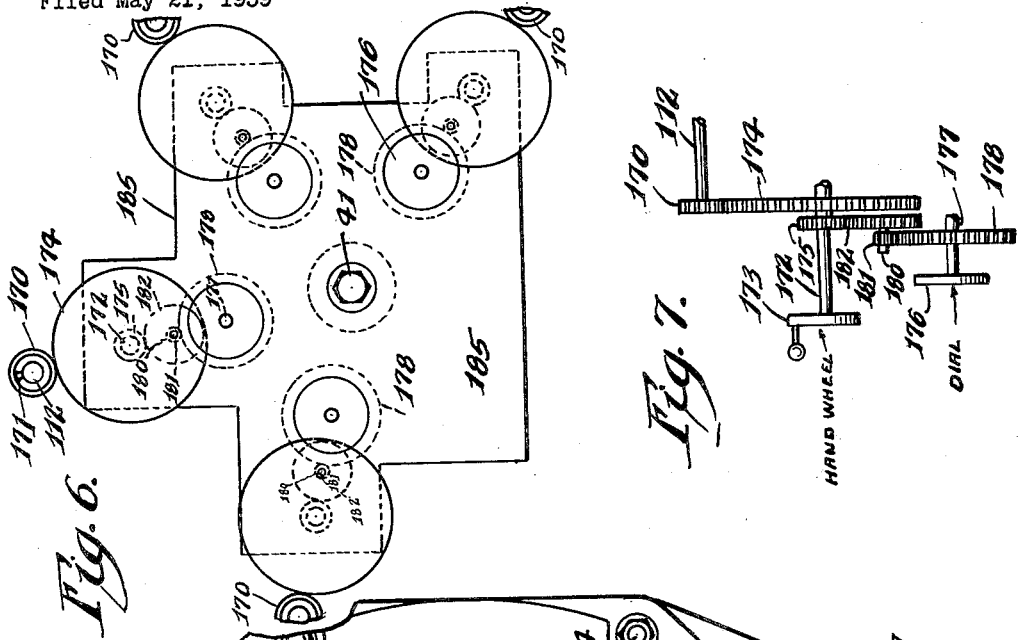
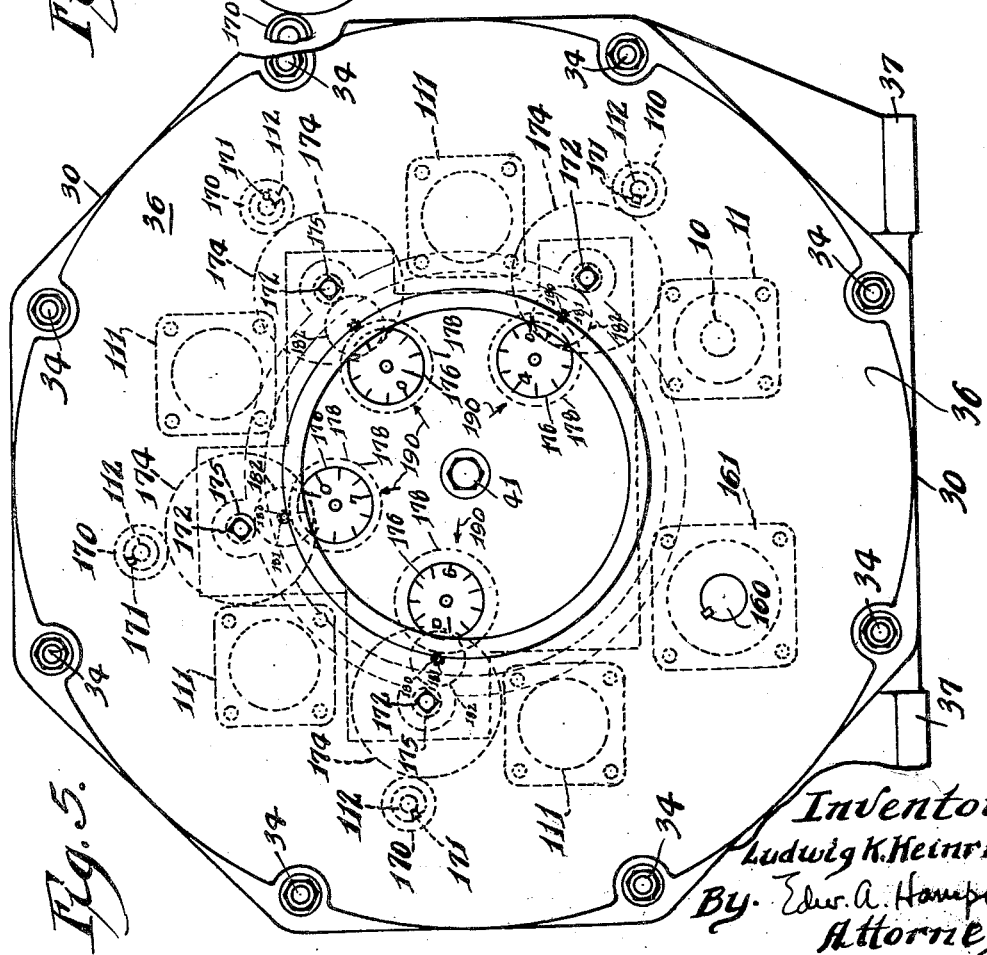
Inventor:
Ludwig K. Heinrich
By. Edw. A. Hampson
Attorney.

United States Patent Office 3,060,766
Patented Oct. 30, 1962

3,060,766
VARIABLE RATIO SPEED REDUCER
Ludwig K. Heinrich, Chesterton, Ind.
(747 Butler St., Saugatuck, Mich.)
Filed May 21, 1959, Ser. No. 814,858
8 Claims. (Cl. 74—740)

This invention concerns a speed reducer for transforming revolutions per minute input into a lesser number of revolutions per minute output by uniform steps, and which is so constructed that the ratio of the input and output speeds may be varied through the entire range by small uniform increments when considered in the usual manner, that is, as the ratio of the input speed to the output speed.

In connection with the following description, however, it is preferred to refer to the ratio of the output to input speeds, which is the inverse of the foregoing, so that when so referring thereto the ratio decreases according to a series of equal decrements.

The specific exemplification of the invention illustrated in the accompanying drawings and particularly described is the presently preferred embodiment of the invention. Based on the following disclosures herein it will be obvious that those skilled in the applicable art will readily understand that the specific disclosure thereof may be readily modified or, more properly, may be readily redesigned as a unit of somewhat different form and of differing detail construction which will result in an apparatus providing the same variable ratio as that of the specific disclosure hereof or, if desired, in a different variable ratio but which, however, will be in a series of uniform decrements as regards the ratio of the output speed to input speed.

The apparatus disclosed is of simple construction and is one which, considering input revolutions per minute, will have in the particular exemplification the ability, per revolution of input per minute, of transforming such to an output revolution, in this particular instance, by uniform steps each of 0.0001 revolution per minute through the range of 1.0999 to zero.

The apparatus is relatively small considering other available apparatus for providing for a wide range of speed reduction.

The ratio revolutions, output speed to input speed, are accurate throughout the entire range of the apparatus, and such ratios are at all times maintained without the necessity of providing for compensation or more or less continuous adjustment. The adjustment for varying the ratio of output speed to input speed is simple and the adjustment is easily made, and once having been made is positive.

As distinguished from other known available devices, there is no slippage within the speed-transforming mechanism nor a high input speed required in order that the device may perform promptly. The mechanical efficiency of the apparatus is high due to its simple construction. Other than for the casing in which the mechanism is contained, the substantial elements are constituted of straight and parallel shafts and spur gears together with conventional anti-friction bearings. Due to the construction of the device there is no end thrust force exerted on any of the shafts unless for some particular reason it is desired to operate the device in a position at right angles to the position considered normal for the operation thereof, that is, unless it is desired to operate the device with the shafts extending vertically. If the device is built to be operated with shafts extending vertically, then only in such case will thrust bearings be required under the shafts, but such are necessary only for the purpose of supporting the shafts and the gear members carried thereby.

The object of the invention hereof is the provision of a variable ratio speed reducer which has the advantages above referred to and which, among others, comprises an apparatus which is relatively small, of relatively low cost, provides for accurate speed reduction in equal diminishing ratios, provides for easy adjustment, and which avoids inherent defects of variable ratio speed reducers now available but which lack various of the advantages of the device hereof.

It is to be understood that the specific embodiment herein illustrated and described is that presently preferred but that it is contemplated the teachings hereof when availed of will provide a basis for the design and construction of other devices having the attributes and advantages of the device hereof but differing in details of construction.

The inventions hereof are illustrated in the accompanying drawings, wherein—

FIGURE 1 is a composite section with parts shown in elevation, the section with respect to the right hand portion of the figure having been taken on line A—A of FIGURE 2, and the section of the left hand portion having been taken on line A—A' of FIGURE 2. The clockwork adjustment mechanism has been omitted from FIGURE 1 in the interest of clarity of illustration.

FIGURE 2 is a section taken on line B—B of FIGURE 1;

FIGURE 3 is a section taken on line C—C of FIGURE 1, the input unit, however, being omitted in the interest of clarity of illustration;

FIGURES 4-A to 4-J inclusive are detail features showing the transfer gearing;

FIGURE 5 is an end elevation of the operator's end of the device;

FIGURE 6 is a diagrammatic view of the clockwork adjusting gearing for varying the speed reducer ratio;

FIGURE 7 is a diagrammatic illustration of the gear train comprising one of the clockwork adjusting gearing mechanisms;

FIGURE 8 is a schematic development of the overall planetary ratio reduction gear train; and FIGURE 9 is a detail of one of the selector elements.

In the following description of the device hereof, various parts will be referred to in the aggregate, and for such purpose the mechanism of the device has been broken down into sub-elements which, insofar as possible, will be referred to as the—

Input gear series
    Selection gearing
    Coupling or transfer gearing
    Selector element
    Compounding gear train
    Indicators and gear train therefor.

Power is applied from any suitable motor or the like to drive input shaft 10 which is mounted in bearings 11. This shaft may be double ended, that is, as well as having an end projecting from the device at one end of the device the shaft may also extend through the housing at the other end as 10a, so that the power input may be from either end of the device.

There are mounted on shaft 10 a series of ten gears identified by numerals 12 to 21, inclusive, which gears are secured to the shaft 10 as by key 22. The shaft 10 together with the series of gears 12 to 21 mounted thereon constitute the power input element of the device.

The series of gears 12 to 21 comprise gears having teeth, the number of which are in arithmetical progression with a common difference of 10. Actually, the first gear of the series, gear 12, should have but ten teeth. However, the gear would be so small that it could not be mounted on shaft 10 so that actually gear 12 is one having twenty teeth. Gear 12, however, in the overall combination, acts as though it were a ten-tooth gear in that the gear train, as will be more particularly described in connection with the coupling or transfer gearing subcombination, a step-down gear combination of a ratio 2 to 1, is interposed so that thereby the effect of gear 12 is as though it were actually a ten-tooth gear.

The remaining gears of the series, gears 13 to 21, have teeth, respectively, 20, 30, 40, 50, 60, 70, 80, 90 and 100 in number. These gears are shown as each having an integral spacing boss or sleeve on one face to uniformly space the gears on shaft 10. It will be understood, of course, that instead of each of these gears 13 to 21 having an integral spacing boss, a separate spacer may be substituted.

The selection gearing element comprises a shaft 41 which is mounted in end plates 35 and 36. On shaft 41 there are mounted gears 42 to 52, inclusive, all of an equal number of teeth, one hundred teeth each, excepting gear 42 which, although of the same number of teeth, is a segmental gear actually constituting slightly more than half of a full gear.

Gears 43 to 52 are journaled on shaft 41. These gears on shaft 41 are spaced by interposed mounting brackets which are identified in pairs by numerals 60 to 69, inclusive. There being no mounting brackets interposed between gears 42 and 43, an equivalent spacer collar 60a is inserted to space these gears a distance which is the same as the spacing of the selection gearing element. Also, at the one end of this series of gears, since there is but one interposed bracket 60, spacer collar 60b is inserted to obtain the proper spacing. This entire series of gears 42 to 52 are secured together on shaft 41 by a suitable collar 54 having set screw 55 for securing collar 54 in place. The segmental gear 42 is secured against rotation on shaft 41 by means of a key 53.

The coupling or transfer gearing element of the combination comprises the bracket 60 to 69, inclusive, mounted at one end on shaft 41, as above referred to, and mounted at their lower ends on shaft 40. These brackets 60 to 69 have mounted thereto the actual transfer gears which couple gears 12 to 21 of the input gear series with gears 43 to 52 of the selection gearing subcombination. The first of this series of transfer gearing is that between gear 12 and gear 43. As referred to, gear 12, because of its design features, is a twenty-tooth gear instead of a ten-tooth gear which is required in the series. It is geared down by the interposed reduction gearing which comprises connected gears 90 and 91 mounted on shaft 80 which, in turn, is mounted between the pair of brackets 60. This construction just described has the effect of connecting gear 12 to gear 43 through a reduction whereby gear 43 is driven as though gear 12 were a ten-tooth gear instead of the twenty-tooth gear which it actually is. The entire train of this first element which has just been described is diagrammatically illustrated in FIGURE 4A, wherein a bracket 60 is shown as mounted on shafts 40 and 41, and has mounting shaft 80 with gear 90 meshing with gear 12 and gear 91 meshing with gear 43. For each of the other gear pairs, 13—44, 14—45, etc., there are provided respective pairs of brackets 61—62, etc., each of which mounts an interposed transfer gear from the gear of the input gear series to the cooperating gear of the selection gear series. The specific relationship for each of these transfer gears is shown in FIGURES 4B to 4J, inclusive. Brackets 61 on stub shaft 81 carry gear 92 which is the transfer gear between gear 13 and gear 44. Brackets 62 carry gear 92 which is the transfer gear between gears 14 and 45. Brackets 63 carry gear 92 which is the transfer gear between gears 15 and 46. Brackets 64 carry gear 92 which is the transfer gear between gears 16 and 47. Brackets 65 carry gear 92 which is the transfer gear between gears 17 and 48. Brackets 66 carry gear 92 which is the transfer gear between gears 18 and 49. Brackets 67 carry gear 92 which is the transfer gear between gears 19 and 50. Brackets 68 carry gear 92 which is the transfer gear between gears 20 and 51. Brackets 69 carry gear 92 which is the transfer gear between gears 21 and 52. As these transfer gears 92, just above referred to, merely transfer the rotation of one gear to the other, they may be of any suitable number of teeth but, as illustrated in the drawings, the mounting of these gears 92 in the brackets is such that gear 92 in FIGURE 4B is a sixty-tooth gear, whereas gear 92 in each of the further illustrations, FIGURES 4C to 4J, inclusive, is a gear of fifty teeth.

From the foregoing it should be quite evident that each of the successive gears 43 to 52 mounted for rotation on shaft 41 will, by the interposed transfer gearing described, be driven from the gears of the input gear series at relative speed determined by the number of teeth of the gears of the input gear series. Merely by way of example, assuming a speed of 1000 r.p.m. of the input shaft 10, the gear 43 will be rotated at a speed of 100 r.p.m., gear 44 at 200 r.p.m., gear 45 at 300 r.p.m., and finally gear 52 at 1000 r.p.m., each as determined by the number of teeth of the gears of the input gear series mounted on shaft 10. Since a selector gear selectively engages with one or the other of gears 42 to 52, inclusive, it is preferable that the teeth of these gears at their side edges be slightly beveled and slightly relieved in order that a selector gear may be smoothly engaged therewith.

To engage with the selection gearing element, as just above described, there are provided four selector element units, each of similar construction so that the description of one of the units will constitute a description of the four units. These selector element units are mounted on shafts 110, which shafts are concentric with shaft 41 of the selection gearing unit. In the drawings, FIGURE 2, these four selector element units are identified as the 0.1 unit, 0.01 unit, 0.001 unit, and the 0.0001 unit. Each selector element unit comprises a shaft 110 which is mounted in bearings 111 which in turn are mounted to end plates 35 and 36. This shaft 110 is fluted for that portion of its length slightly exceeding the length occupied by the series of selection gears 42 to 52, the remainder and unfluted portion being identified by numeral 110a.

There is mounted on shaft 110 the selector element unit which is generally identified by numeral 120. This element 120 has depending side arms 121 provided with bores in which are mounted the hubs of a gear 124 having an extended hub on one side thereof identified by numeral 123 and hub 124a on the other side. This hub portion of gear 124 is provided with internal fluting 125 corresponding to the fluting of shaft 110. Mounted on the extended hub 123 of gear 124 there is a free running gear 126, which free running gear has the same number of teeth as does gear 124 which, in the specific example hereof, is a 110-tooth gear. Mounted against gear 126 there is provided a ring member 127 with pockets to receive one end of a spring, the other end of which is received in an opposite ring member 127 also having spring end receiving pockets which is mounted against the inside face of side arm 121. These springs, which are mounted between the rings 127 are identified by numeral 128 and they serve to frictionally engage the face of gear 126 with the adjacent face of gear 124.

The construction just described is provided so that as the selector element 120 is moved along shaft 110 to engage a particular gear of gears 42 to 52 in the direction such that gear 124 will be speeded up, gear 126, being first engaged, will serve to yieldingly speed up gear 124 so that gear 124 may smoothly engage with the selection gear when brought into register therewith.

The outer end of selector element 120 is provided with a bore, through which extends a fixed shaft-like member 114, which is mounted at its ends in end mounting plates 35 and 36. Shaft member 114 is provided with shallow recesses or dimples 115, of which there are ten, equally spaced. These dimples 115 cooperate with a latch provided on selector element 120, which latch is illustrated as comprising a ball member 129, spring-loaded by spring 130 to force the ball 129 into a dimple 115 when they are lined up. It will be understood that the dimples 115 and latch are so positioned that when the latch is in engagement with a dimple, gear 124 will be enmeshed with a gear of equally spaced gears 42 to 52. On shafts 114, excepting the 0.1 or tenths shaft 114, there is provided a collar 131 suitably secured thereon by a set screw or pin which is not shown. On the three shafts 114, other than such shaft of the 0.1 or tenths selector, the collar 131 is positioned on shaft 114 adjacent the end mounting plate 35 so positioned that selector element 120 on these shafts may be positioned for engagement with any of the gears 42 to 51, inclusive, that is, collar 131 is positioned to prevent engagement of selector gear 124 with gear 52. The collar not being provided on the shaft 114 of the 0.1 or tenths selector element, it is apparent, of course, that selector 120 of this selector element can be moved to the tenth or last position adjacent mounting plate 35 so that gear 124 thereof can mesh with each of the gears 42 to 52, inclusive.

From the foregoing it should be obvious that three of the selector members 120 may be moved longitudinally on shafts 110, 112 and 114 to bring selector gears 124 selectively into engagement with each gear 42 to 51, inclusive, and that in connection with the fourth selector, that is, the 0.1 or tenths selector, such may be additionally selectively engaged with gear 52.

Shafts 112, which are rotatably mounted in end mounting plates 35 and 36 and the bore 122, are threaded with three thirty-second inch square thread-double thread, whereby as a shaft 112 is rotated, selector member 120 will be accordingly moved longitudinally of the shafts 110, 112 and 114 on which it is mounted. The means for rotating the shafts 112 for moving the selector longitudinally will be hereafter described, but it is apparent that, depending on the rotation of a shaft 112, the selector 120 mounted thereon may be moved to register its selector gear 124 with the desired gear of the series 42 to 52, inclusive, except as such longitudinal movement is limited by collars 131 mounted on shafts 114, as heretofore described.

The speed reduction and variation thereof is obtained through the inter-action of what might be termed a series of connected planetary gearing, an element of each of which is driven by shaft 110 of one of the selector gear units mounted to the unfluted portion of 110a thereof. Actually, there are three planetary gear systems interconnected in series, these being associated respectively with the three selector units 0.1, 0.01, and 0.001. The 0.0001 selector unit on shaft 110 does not carry or drive a planetary gear system such as does shaft 110 of the other three selector units, but instead there is mounted thereon a gear 140 keyed thereto by key 140a. It will be understood, of course, that this system of gearing just above described is mounted in the end of the shell 30 adjacent end mounting plate 35 and positioned beyond the last gear 52 of gear series 42 to 52. This gearing system is not, of course, in a plane, as might appear in FIG. 8 of the drawings, which is a plane development of such gearing. Actually, this gear system is in more or less circular arrangement, that is, the various elements thereof are mounted on shafts 110 in what might be termed a substantially circular arrangement, as clearly apparent in FIG. 3 of the drawing.

To follow through this gearing series it will be seen that such are mounted on and to the end portions of what have heretofore been referred to as "fluted" shafts 110 positioned on the end portions not divided with the fluting, that is, the normal shaft portions which are identified by numeral 110a.

Following through the gear reduction series, on shaft portion 110a of selector unit 0.0001 there is mounted gear 140 keyed thereto by key 140a. This gear 140 meshes with gear 145 which is a portion of the planetary gearing mounted on shaft 110a of selector unit 0.001. Since gear 145 carries shafts 146 on which the planetary gears are mounted, gear 145 may be referred to as a planet gear carrier. This gear 145 freely revolves on shaft portion 110a and has mounted thereon pairs of planet gears 147 and 148 which are carried by shaft 146 which is mounted in the web of gear 145. Keys 146a secure planet gears 147 and 148 to shafts 146.

These planet gears 147 and 148 mesh respectively with sun gear pair 149 and 151 which are mounted on the shaft portion 110a, sun gear 149 being loose or free to revolve on the shaft, whereas sun gear 151 is keyed to the shaft by key 152. Gear 150 is also mounted on the shaft freely revoluble thereon, this gear, however, being connected to sun gear 149 by a hub 153 common thereto so that it results that gear 150 will revolve with sun gear 149.

On the shaft portion 110a of selector unit 0.01 there is mounted a second planetary gear system which is the same as that mounted on the 0.001 shaft portion 110a. This second planetary gear system, however, is reversed with respect to the one preceding, that is, it is in effect turned 180° whereby gear 150 of the preceding planetary system meshes with gear 145 of the second planetary gear system.

On smooth shaft portion 110a of the 0.1 selector unit assembly there is mounted a third planetary gear system which is reversed with respect to the second planetary gear system, that is, turned 180° whereby its arrangement on the shaft is the same as that of the first planetary gear system above described, and whereby gear 145 of this third planetary gear system meshes with gear 150 of the second or intermediate planetary gear system. In this third planetary gear system it is to be noted, however, that instead of being provided with gear 150, there is provided a driven gear 154 which, although similarly mounted and arranged as are the gears 150 of the preceding planetary gear systems, is of a different size.

Finally, gear 154 of the third above-described planetary gear system meshes with a gear 155 mounted on shaft 160 which is the output shaft of the device and which gear is keyed to shaft 160 by key 156.

In connection with the above-described gear system, the reversal of the respective planetary gear systems, as illustrated and described, is for achieving compactness, but otherwise is not necessary as it is obvious that if the space provided were sufficiently lengthened these successive planetary gear systems could each be arranged on their respective shafts in the same direction or order but, in such case, they would take up a longitudinal length at least twice that which suffices for the arrangement as is illustrated and described.

For properly positioning and retaining the several planetary gear systems on their shafts and with relation to end plate 35, there are provided suitable collars 159 mounted between end plate 35 and the respective planetary gear systems and collars 157 secured by set screws 158 which are provided to secure planetary gear assemblies in their assembled relation.

From the foregoing it should be obvious, depending upon the position of the selector units, that rotation of the shaft 110 of 0.0001 selector unit shaft will cause gear 140 mounted thereon to impress a controlled rotational component on planet carrier gear 145 of the 0.001 planetary gear system. This first planetary gear system in turn, by gear 150, impresses a rotational component on planet carrier gear 145 of the second or 0.01 planetary gear system. Gear 150 of the second or 0.01 planetary gear system impresses a rotational component on planet carrier gear 145 of the third or last (0.1) planetary gear system. The compounded effect of all the preceding gearing is impressed by gear 154 on gear 155 to drive output shaft 160.

Whereas, in the foregoing the number of teeth in the various gears have been given in some instances, it is deemed that it would now be well to set out in full the number of teeth in all the various gears which have been heretofore referred to. It will be understood, of course, that the gear relationships, which will be specifically set out, are those which have been selected for a specific device, and that one skilled in the art, understanding the various ratios involved, might redesign the device with gears having different numbers of teeth or, were it desired to have a different relationship or ratio of input r.p.m. to output r.p.m., might design a similar device but with gears of different teeth ratios throughout. This specific device illustrated and described was designed as a five horsepower variable ratio speed reducer to provide a variation or ratio between input and output varying by ten thousandths so that, assuming an input of ten thousand r.p.m., the speed of the output shaft may be reduced by steps of one r.p.m. down to one r.p.m., that is, an over-all ratio of ten thousand to one in successive decrements of one r.p.m.

In the device, as has been described, gears 12 and 13 each have 20 teeth; gear 14—30; gear 15—40; gear 16—50; gear 17—60; gear 18—70; gear 19—80; gear 20—90; gear 21—100.

The reduction gearing to in effect reduce 20-tooth gear 12 to have the effect of a 10-tooth gear, comprises gear 90 having 70 teeth and connected spur gear 91 having 35 teeth. The gears mounted on shaft 41 of the selector gearing element, that is gears 42 to 52, inclusive, each have 100 teeth, but in connection therewith it is to be noted that gear 42, the fixed gear, is a segment of a gear having 100 teeth. The coupling or transfer gears interposed between the series of gears 13 to 21 and 44 to 52 have, between gears 13 and 44—60 teeth, with the transfer gears between 14 and 45, 15 and 46, etc., each having 50 teeth. Selector gear 124 and its associated gear 126 on the 0.1, 0.01 and 0.001 shafts are each gears having 110 teeth, the 0.0001 shaft having 100 teeth.

Now moving on to the various gears driven by the shafts 110, the 0.0001 shaft carries gear 140 having 115 teeth. Gear 140 meshes with the planet carrier gear 145 mounted on the 0.001 shaft, which has 115 teeth. The planet gears 148 carried by this first planet carrier gear 145 have 30 teeth, whereas planet gears 147 carried thereby each have 32 teeth. Planet gears 148 mesh with sun gear 151 having 33 teeth, whereas planet gears 147 mesh with sun gear 149 having 32 teeth. Gear 150 mounted to sun gear 149 and rotating therewith has 115 teeth.

The second and third planet gear systems mounted on the 0.01 and 0.1 shafts are identical with the above described planetary gear system described in detail except that in the planetary gear system mounted on the 0.1 shaft the driven or what might be termed the output gear 154, instead of being provided with 115 teeth is a gear having 80 teeth. This gear 154 of the planetary gear system mounted on the 0.1 shaft drives gear 155, also having 80 teeth, which gear is mounted on the output shaft 160.

It is believed that the foregoing description is ample whereby those skilled in the art may readily perceive the operation of the device, and accordingly but a very brief over-all description of the operation will be given as follows:

Rotation imparted to input shaft 10 will rotate the series of gear 12 to 21 keyed thereto whereby, through transfer gears 90 and 92, the series of gears rotating on fixed shaft 41 will be rotated at speeds determined by their respective numbers of teeth whereby, assuming for convenience, shaft 10 is rotated at 100 r.p.m., gear 43 will be rotated at 10 r.p.m. with each successive gear rotating at an increment of 10 r.p.m., so that gear 52 rotates at 100 r.p.m. or at the same rate of rotation as is applied to input shaft 10. Depending on the position of selector units 120, the shafts 110 will be rotated in the same ratio to the r.p.m. impressed on shaft 10, as does the gear between gears 43 and 52, inclusive, with which the selector element 120 is meshed, multiplied by 100/110 for 0.001, 0.01 and 0.1 shafts.

In visualizing the operation of the device, the condition will be assumed wherein selector element 120 mounted on each, the 0.001, 0.01 and 0.1 shafts 110, is in its extreme or inoperative position, that is, meshed with segmental gear 42. The selector 120 on the 0.0001 shaft 110 will be assumed to be in its third position, as illustrated in FIG. 1 of the drawings, that is, in mesh with gear 45. With the conditions as just assumed it will be seen that each of the 0.001, 0.01 and 0.1 shafts 110 will be held stationary and that consequently sun gears 151 keyed thereto are likewise held stationary.

On rotation of input shaft 10 gear 14, the 30-tooth gear thereon, will be rotated and this, through the associated transfer gear, will rotate gear 45 which is loosely mounted on shaft 41 and which gear 45 will in turn rotate gear 124 of the selector which, through its fluted mounting on the 0.0001 shaft 110, will rotate gear 140 mounted thereon. This gear 140 will then transmit rotation to planet carrier gear 145 of the 0.001 planetary gear system with the result that the rotary motion imparted to its gear 150 will drive planet carrier gear 145 of the planetary gear system 0.01, with the resultant rotation of gear 150 of this planetary gear system transmitting rotation to planet carrier gear 145 of he 0.1 planetary gear system, and finally, by gear 154 of this system, driving gear 155 keyed to output shaft 160 and thus effecting the reduction ratio in accordance with the setting of the selector elements 120, as assumed in the beginning of this explanation of the operation.

Assuming that the input shaft 10 is rotated at a speed of 10,000 r.p.m., it follows that in accordance with the foregoing the output shaft will be rotated at a speed of 3 r.p.m. Correspondingly, should selector 120 for the 0.0001 shaft 110 have been set to the fourth position, that is, in mesh with gear 146, the output shaft would be rotated at 4 r.p.m.

With the condition just above described existing, if selector 120 for the 0.1 shaft 110 is advanced to the third position, that is, also in engagement with gear 45, then the combined effect of the rotation of the 0.0001 and 0.1 shafts will, through the effect of the planetary gearing, impress 3003 r.p.m. on output shaft 160.

Now if selector 120 for the 0.01 shaft 110 is advanced to the third position, that is, also engaging gear 45, then this shaft will rotate and the combined effect of the rotation of the 0.0001, 0.01 and 0.1 shafts will result in imparting 3303 revolutions to the output shaft.

Finally, if selector 120 for the 0.001 shaft is moved to the third position, then all of the shafts, 0.0001, 0.001, 0.01 and 0.1, will be rotated and the combined effect thereof acting through the gearing as described will impart 3333 r.p.m. to the output shaft 160.

To obtain 3339 r.p.m. to the output shaft 160, leaving the other three selectors positioned as has been above described, moving selector 120 for the 0.0001 shaft 110 to the next to last or ninth position, to engage gear 51, will result in the desired speed of output shaft 160, that is, that of 3339 r.p.m. Finally, if each of the selectors 120 is moved to its outermost position, that is, with the selector for the 0.1 shaft in tenth position, that is, meshing with gear 52, and with the other three selectors 120, as limited by collars 131 on shaft 114 to mesh with the ninth gear 51, then the combined effect of the rotation of the four shafts 110, as modified by the gearing which has been described, will result in imparting to the output shaft 160 a speed of 10,999 r.p.m.

With the foregoing it is believed it will be readily understandable that by appropriate positioning of the selectors 120 at the various positions 1 to 10, taking segmental gear 42 as a base and limited to the ninth position except with respect to 0.1 selector assembly by collar 131, will result in imparting to output shaft 160 r.p.m. in accordance with the numerical positioning of the various selector elements 120. It will accordingly be seen, by selective positioning of the selector units 120, that the r.p.m. of output shaft 160 may be varied with respect to the input shaft through a range of 10,999 consecutive ratios thereto by decrements of one-ten thousandth thereof of the input r.p.m.

For varying the ratio of input to output r.p.m., that is, for controlled rotation of threaded shafts 112 which control the movement and positioning of selectors 120, there may be provided various means, either manual or if desired automatic, but for the purposes hereof the relatively simple manual control will be described.

This manual control is mounted between plates 185 which are spaced and secured in such spaced relation by spacer posts 189 and between which plates 185 the requisite gear train is mounted. The construction here involved is similar to the construction of the works of a watch, where the gear train is mounted between spaced plates which carry the end bearings for the shafts of the various gears of the gear train. The spacer posts 189 may be either riveted over at their ends to hold the assembly together or, as will be well understood by those skilled in the art, one end spacer post 189 may be threaded into one of the plates 185 with the other threaded end of the spacer post extending through the other plate 185 and the whole then secured together by a nut applied to the threaded end of spacer post 189 extending through and beyond the surface of the second plate 185.

The adjusting gear assembly, comprising the spaced plates 185 secured together as has just been described, is mounted in one end of the device inside the housing head 32 at the input end of the device, and it is mounted to mounting plate 36 in any convenient manner as by tack-welding at a number of convenient points around the edge of the plate 185 which lies against mounting plate 36 or, as will be well understood, suitable holes may be provided near the edge of plate 185 and the assembly may be secured to mounting plate 36 by stud bolts tapped into suitably threaded openings provided in mounting plate 36.

Mounted between plates 185 there is provided a gear train as diagrammatically illustrated in FIGURE 7, it being understood, of course, that the shafts of the various gears are suitably supported in bearings provided in spaced plates 185.

A suitable hand wheel 173 is mounted on shaft 172 which carries small gear 175 and large gear 174. Rotation of hand wheel 173 causes rotation of large gear 174 which meshes with gear 170 mounted on threaded shaft 112 and secured thereon by key 171. Gear 174, which is rotated on rotation of the hand wheel, has 96 teeth, and gear 170 mounted on threaded shaft 112 has 32 teeth, so that it follows that one complete rotation of hand wheel 173 with consequent complete rotation of 96-tooth gear 174 will cause three revolutions of small gear 170 having 32 teeth, so that for each revolution of hand wheel 173 shaft 112 will be revolved three revolutions.

To provide for visual control of the adjustment of the device there are provided numbered dials and indicators, so that at all times the ratio adjustment existing, or as it is being changed, is visible. For such purpose there is provided a dial for indicating the adjustment of each of the four selectors 120. These dials are identified by the numeral 176 and in connection therewith particular attention is directed to the fact that three of these dials, that is those indicating the adjustment of the selecor 120 for each of the 0.01, 0.001 and 0.0001 shafts 110 are provided with ten equal spaces and numbering 0 to 9 each, whereas dial 176, for the fourth or 0.1 shaft 110 is divided into eleven spaces and has numbering 0 to 10, inclusive. This difference in the dials 176, as just described, is due to the fact that, as has been previously pointed out, it is only the 0.1 shaft 110 in connection with which the selector 120 has eleven positions, that is, it may mesh with each of the gears 42 to 52, inclusive, whereas for the other three shafts 110 and selector units 120, due to the provision of collars 131 secured on shafts 114, only ten positions are provided, that is, can selectively mesh with only each of gears 42 to 51, inclusive.

For driving the dials 176 there is provided a train of gearing driven from 36-tooth gear 175 and which comprises a 72-tooth gear mounted on shaft 180 and meshing with gear 175. Also mounted on this shaft 180 is a small 12-tooth gear 181 which meshes with the 120-tooth gear 178 which is mounted on shaft 177 on which is also mounted dial 176. It, of course, follows that as the hand wheel is turned, gear 170 on threaded shaft 112 is rotated and thedial 176 is rotated in synchronism through the gear train last described. By suitable manipulation of hand wheels 173 the selectors 120 for the various shafts 110 can be selectively positioned in accordance with the foregoing explanation of the functioning thereof to provide variable ratios through the device ranging from zero to one by one-ten thousandth intervals, and that such ratio will be shown by the dials, as has been just above described, in accordance with the numeral thereon opposite the respective arrows 190, which may be provided either on the outer of plates 185 or on transparent view plate 33 which is secured over the opening in end head member 32.

The operation of the variable ratio speed reducer hereof having been rather fully explained in the course of setting out the construction and arrangement thereof, it is believed that such should be understood without any particular further explanation. However, the operation of the device may be summarized as follows:

The device hereof is an adjustable or variable speed reducer by means of which the input r.p.m.'s are transmitted to the output shaft in the ratio of output speed to input speed, which may be any one of the selected 10,999 possible ratios thereof.

The general construction comprises a series of gears of increasing size mounted on the input shaft with the number of teeth in each successive gear greater by a uniform amount than the teeth of the preceding gear. This series of gears driven by the input shaft through transfer gearing drive a series of gears all having the same number of teeth and are rotatably mounted on a second shaft. Circumferentially of this shaft there are provided shafts on which selecter members carrying gears which mesh with the freely rotating gears, which selectors are movable on the shafts on which they are mounted for selective engagement with any one of the freely rotating gears. The gears of the selectors drive a compound gear system including planetary gearing which transmits the rotation of the shafts driven by the selector gears at a speed determined by the effect of the rotation of the shafts driven by the selector gears to rotate the output shaft at a speed which is the selected speed for the rotation thereof as determined by the position of the selectors.

It is to be clearly understood that the foregoing description hereof is the description of a preferred embodiment, and that such is susceptible to various modifications and variations in accordance with the teachings hereof. For example, the steps between the gears mounted on and driven by the input or drive shaft may be greater or lesser than the 10-tooth difference herein illustrated and described and the number thereof may be less or more than the number of the exemplification hereof.

Additionally, instead of four selector elements as herein disclosed, there may be utilized fewer or a greater number of selector elements with their associated gearings. In case it is desired to incorporate a greater number of selector elements, it is evident that such would require a distinct modification of the structure hereof whereby two shafts 41 would be provided with the series of freely revolving gears mounted thereon, and with the transfer gearing from the gears on the drive shaft so arranged as to drive the gears on both shafts 41 at the same rotational speeds and in the same direction. In such construction the fluted shafts 110 and their associated selector elements would of necessity have to be re-arranged so as to be positioned circumferentially of the two sets of freely revolving gears, so that the selector gears carried by the selector units might be properly meshed therewith, whereby these shafts will drive the associated gearing for transmitting the power to the output shaft in the selected ratio with respect to the input speed.

Of course, in case of any modification hereof involving the use of gears having the numbers of teeth varying from those of the number of teeth of the gears as heretofore given, will require re-calculation of the ratio of the input to output speeds and of the increments or decrements between the limits thereof.

A further variation of the teachings hereof is that of reducing the number of gears mounted on the input shaft and likewise reducing the transfer gearing to a such reduced number of the freely revolving gears if a lesser number of steps for ratios between input and output speeds is sufficient.

It is to be clearly understood that the disclosure hereof is to be comprehended as not only including the foregoing suggested possible variations, but that such also includes all other variations and modifications which would be apparent to one skilled in the art, following the disclosure and teachings hereof.

The inventions hereof having been disclosed and described in detail, I claim:

1. A variable ratio speed reducer comprising in combination serially related planetary gear units, each planetary gear unit including a planet carrying gear and an output gear, a drive shaft, spaced sun gears mounted on the shaft, one sun gear secured to the shaft and rotating therewith, the other sun gear revoluble on the shaft, the planet carrying gear mounted for rotation on the shaft, planet gears mounted to the planet carrying gear revolvable therewith and relative thereto and meshing with the sun gears, the output gear secured to the sun gear which is revoluble on the shaft, the output gear of a planetary gear unit drivingly engaging the planet carrying gear next in series, a gear meshing with the planet carrying gear of the first planetary gear unit of the serially related planetary gear units, a drive shaft on which the said gear is secured and individual means driving the drive shaft of each planetary gear unit and the drive shaft on which said gear is secured.

2. A variable ratio speed reducer comprising in combination serially related planetary gear units, each planetary gear unit including a planet carrying gear and an output gear, a drive shaft, spaced sun gears mounted on the shaft, one sun gear secured to the shaft and rotating therewith, the other sun gear revoluble on the shaft, the planet carrying gear mounted for rotation on the shaft, planet gears mounted to the planet carrying gear revolvable therewith and relative thereto and meshing with the sun gears, the output gear secured to the sun gear which is revoluble on the shaft, the output gear of a planetary gear unit drivingly engaging the planet carrying gear next in series, a gear meshing with the planet carrying gear of the first planetary gear unit of the serially related planetary gear units, a drive shaft on which the said gear is secured, individual means driving the drive shaft of each planetary gear unit and the drive shaft on which said gear is secured and means individually varying the speed of the means driving the drive shaft of each individual planetary gear unit and the drive shaft on which said gear is secured.

3. In a variable ratio speed reducer, the combination comprising a plurality of variable speed drive shafts and associated planetary gear units, a gear secured to each drive shaft, the gear secured to each intermediate of the drive shafts being a sun gear element of a planetary gear unit, a second sun gear mounted to and freely rotatable relative the drive shaft, a planet carrying gear mounted to and freely rotatable relative the drive shaft, connected planet gears revolubly mounted to the planet carrying gear and meshing with the sun gears, a driving gear connected to the second sun gear and revolubly mounted relative the drive shaft, the gear secured to the first drive shaft drivingly engaging the planet carrying gear of a first planetary gear unit, the driving gear of the first planetary gear unit drivingly engaging the planet carrying gear of a succeeding planetary gear unit, an output shaft, a driven gear mounted thereon, the driving gear of a succeeding planetary gear unit engaging the driven gear mounted on the output shaft and means variable independently varying the speed of rotation of the variable speed drive shafts.

4. In a variable ratio speed reducer, the combination comprising a journaled input shaft, a fixed shaft parallel thereto and spaced therefrom, journaled selector shafts associated with the fixed shaft, parallel thereto, radially spaced therefrom and arcuately spaced one from the other, a plurality of gears mounted on and secured to the input shaft, a like plurality of like gears rotatably mounted on the fixed shaft, means interposed between each successive pair of gears, one on the input shaft, the other on the fixed shaft and imparting to successive gears on the fixed shaft independent rotation relative the fixed shaft, a selector gear on and slidable lengthwise of each selector shaft, spline means drivingly connecting said selector gears to their said shafts and means selectively meshing each selector gear of the slidable gears with any selected gear of the gears mounted on the fixed shaft, each of the plurality of gears mounted and secured on the input shaft, the plurality of gears rotatably mounted on the fixed shaft and the gear splined to the selector shafts being of like width, and each of the gears of each series of plurality of gears being spaced from each by an equal distance of at least a gear width, a second gear similar to the gears splined to the journaled selector shafts mounted to and rotatable relative each journaled selector shaft, and means frictionally engaging the adjacent faces of the gears mounted to the respective journaled selector shafts.

5. A planetary gear system comprising serially related planetary gear units, each planetary gear unit comprising an input shaft, a sun gear secured to the input shaft, a sun gear rotatably mounted on the input shaft, an output gear mounted to and rotating with the rotatably mounted sun gear and a planet carrying gear interposed between the sun gears, rotatably mounted on the input shaft and carrying rotatably mounted planet gears meshing with the sun gears, each of the planetary gear units of the system reversed relative each adjacent planetary gear unit, in one of the units, the sun gear secured to the input shaft being to one side of the planet carrying gear and in the reverse unit the sun gear secured to the input shaft being to the other side of the planet carrying gear and successively the output gear of one unit meshing the planet carrying gear of a next succeeding unit of the system, a gear meshing with the planet carrying gear of the first planetary gear unit of the serially related planetary gear units and a drive shaft on which the said gear is secured.

6. A planetary gear system comprised of a plurality of similar planetary gear units serially connected and positioned between spaced parallel planes spaced a distance substantially the axial length of a planetary gear unit of the system, a planetary gear unit of the system comprising an individual drive shaft, a first sun gear mounted to and secured thereto, a second sun gear mounted to and rotatable relative the shaft, a planet carrying gear mounted between the sun gears on the shaft rotatable thereon and a driving gear mounted on and rotatable relative the shaft and mounted to and rotating with the second sun gear, each planetary gear unit of the serially connected planetary gear units of the planetary gear system, relative its preceding planetary gear unit being reversely arranged on its shaft and the driving gear of a preceding planetary gear unit drivingly related to the next succeeding planetary gear unit and meshing with the planet carrying gear thereof, a gear meshing with the planet carrying gear of the first planetary gear unit of the serially related planetary gear units and a drive shaft on which the said gear is secured.

7. In a variable ratio speed reducer, the combination comprising a journaled input shaft, a fixed shaft parallel to the input shaft, a plurality of gears each of equal width mounted on and secured to the input shaft, a like plurality of like gears mounted on the fixed shaft, transfer gearing interposed between each of the gears on the input shaft and each paired gear on the fixed shaft, associated journaled selector shafts radially spaced from the fixed shaft, parallel to the fixed shaft and each arcuately spaced from the other thereof, a selector gear on and slidable lengthwise of each selector shaft, spline means drivingly connecting each selector gear and shaft to which it is mounted and means selectively meshing each selector gear with any selected gear of the gears rotatably mounted on the associated fixed shaft, each of the plurality of gears mounted on the fixed shaft, each of the plurality of gears mounted and secured to the input shaft and the gears splined to the journaled selector shafts being of like width, each of the gears of the sets of plurality of gears spaced from each other, axially, by an equal distance of at least a gear width, a driving gear secured to each selector shaft, the driving gear of each intermediate of the selector shafts being a sun gear element of a planetary gear unit, each planetary gear unit comprising a second sun gear mounted on the selector shaft and rotatable thereon, a planet carrying gear mounted to and freely rotatable relative the selector shaft, planet gearing revolubly mounted to the planet carrying gear and meshing with the sun gears, a secondary driving gear connected to the second sun gear and revolubly mounted relative the selector shaft, the driving gear secured to the first selector shaft drivingly engaging the planet carrying gear of a first planetary gear unit, the secondary driving gear of the first planetary gear unit drivingly engaging the planet carrying gear of a succeeding planetary gear unit, and an output shaft, a driven gear mounted thereon, the secondary driving gear of a succeeding planetary gear unit engaging the driven gear mounted on the output shaft.

8. In a variable ratio speed reducer, the combination comprising the construction defined in claim 7 and including therein a second gear similar to the selector gear splined to each selector shaft, the second gear mounted adjacent the selector gear and rotatable on the selector shaft and means frictionally engaging adjacent faces of the selector gear and said second gear similar to the selector gear mounted on and rotatable relative the selector shaft.

References Cited in the file of this patent

UNITED STATES PATENTS

| | | |
|---|---|---|
| 1,967,559 | Schreck | July 24, 1934 |
| 2,178,229 | Hazard | Oct. 31, 1939 |
| 2,377,400 | Campbell | June 5, 1945 |
| 2,521,771 | Bechle | Sept. 12, 1950 |
| 2,804,784 | Blumentritt | Sept. 3, 1957 |

FOREIGN PATENTS

| | | |
|---|---|---|
| 695,422 | Great Britain | Aug. 12, 1953 |